(12) United States Patent　　　(10) Patent No.: US 12,663,375 B2

Yamamoto　　　(45) Date of Patent: Jun. 23, 2026

(54) SAMPLE OBSERVATION DEVICE AND SAMPLE OBSERVATION METHOD

(71) Applicant: HAMAMATSU PHOTONICS K.K., Hamamatsu (JP)

(72) Inventor: Satoshi Yamamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 311 days.

(21) Appl. No.: 18/382,177

(22) Filed: Oct. 20, 2023

(65) Prior Publication Data

US 2024/0210319 A1　　Jun. 27, 2024

(30) Foreign Application Priority Data

Dec. 27, 2022　　(JP) .................................. 2022-209706

(51) Int. Cl.
*H04N 23/56* (2023.01)
*G01N 21/64* (2006.01)

(52) U.S. Cl.
CPC ..... *G01N 21/6456* (2013.01); *G01N 2201/11* (2013.01); *G01N 2201/127* (2013.01)

(58) Field of Classification Search
CPC .......... G01N 21/6456; G01N 2201/11; G01N 2201/127; G02B 21/0076; G02B 21/367; G02B 21/0032; H04N 23/56; H04N 23/74; H04N 25/531
See application file for complete search history.

(56) References Cited

U.S. PATENT DOCUMENTS

| | | | |
|---|---|---|---|
| 2016/0252717 A1* | 9/2016 | Iwase ..................... | H04N 23/67 |
| | | | 348/79 |
| 2021/0026121 A1* | 1/2021 | Yamamoto ......... | G01N 21/6428 |
| 2022/0342196 A1* | 10/2022 | Fahrbach ............. | G02B 21/367 |

FOREIGN PATENT DOCUMENTS

| | | |
|---|---|---|
| EP | 3528030 A1 | 8/2019 |
| EP | 3869792 A1 | 8/2021 |
| JP | 2015-087723 A | 5/2015 |
| JP | 2018-063292 A | 4/2018 |
| JP | 2019-109403 A | 7/2019 |
| KR | 2022-0115947 A | 8/2022 |
| WO | WO-2011/120629 A1 | 10/2011 |

(Continued)

OTHER PUBLICATIONS

Venkatakaushik Voleti et al, "Supplementary Notes—SCAPE 2.0 Optical resolution characterization", Nature Methods, Sep. 27, 2019, XP055720382.

(Continued)

*Primary Examiner* — Uzma Alam
*Assistant Examiner* — Mamadou Faye
(74) *Attorney, Agent, or Firm* — Faegre Drinker Biddle & Reath LLP

(57) ABSTRACT

In a sample observation device, an image capturing unit includes an area image sensor that performs image capturing by the rolling shutter method in which a start of an exposure period of pixel columns in the pixel region is shifted by predetermined time, and a control unit controls the image capturing unit so that an exposure order in each of the pixel columns is reversed between a period in which a scanning unit scans a sample in a first direction and a period in which the scanning unit scans the sample in a second direction.

12 Claims, 17 Drawing Sheets

(56) References Cited

FOREIGN PATENT DOCUMENTS

| WO | 2014/175220 | A1 | 10/2014 |
| WO | 2021/097300 | A1 | 5/2021 |

OTHER PUBLICATIONS

Migliori Bianca et al, "Light sheet theta microscopy for rapid high-resolution imaging of large biological samples", BMC Biology, Dec. 1, 2018, p. 1-p. 19, XP093132399.

Eugen Baumgart, "Scanned light sheet microscopy with confocal slit detection", Optics Express, Sep. 10, 2012, p. 21805-p. 21814, XP093152035.

* cited by examiner

Z

FRAME ACQUIRED AT
SCANNING SPEED V1

FRAME ACQUIRED AT
SCANNING SPEED V2

25R

Y

SHIFT AMOUNT OF
EXPOSURE POSITION

TRIGGER SIGNAL

T

25R

FRAME ACQUIRED AT
SCANNING SPEED V1

TRIGGER SIGNAL

T

25R

FRAME ACQUIRED AT
SCANNING SPEED V2

25R

FRAME ACQUIRED AT
SCANNING SPEED V1

FRAME ACQUIRED AT
SCANNING SPEED V2

TRIGGER SIGNAL

T

FRAME ACQUIRED AT
SCANNING SPEED V1

25R

TRIGGER SIGNAL

T

FRAME ACQUIRED AT
SCANNING SPEED V2

25R

FRAME ACQUIRED AT
SCANNING SPEED V2

FRAME ACQUIRED AT
SCANNING SPEED V1

25R

SAMPLE OBSERVATION DEVICE AND SAMPLE OBSERVATION METHOD

TECHNICAL FIELD

The present disclosure relates to a sample observation device and a sample observation method.

BACKGROUND

As a sample observation device, for example, a device described in Japanese Unexamined Patent Publication No. 2018-063292 is known. The sample observation device includes an irradiation optical system that irradiates a sample with a planar light, a scanning unit that scans the sample with respect to an irradiation surface of the planar light, and an imaging optical system that has an observation axis inclined with respect to the irradiation surface and images observation light generated in the sample by irradiation with planar light, an image acquiring unit that acquires a plurality of pieces of partial image data corresponding to a part of a light image of the observation light imaged by the imaging optical system, and an image generating unit that generates observation image data of the sample on the basis of the plurality of pieces of partial image data generated by the image generation unit.

SUMMARY

The above-described image acquiring unit of the sample observation device uses area image sensors such as a CMOS image sensor and a CCD image sensor. These area image sensors are arranged on an image-forming surface of the observation light formed by the imaging optical system, and capture an optical image of the observation light to generate two-dimensional image data. Examples of an image capturing method of the area image sensor include a global shutter method and a rolling shutter method.

The global shutter method is an image capturing method in which a start of an exposure period of each of pixel columns coincides with each other, and the rolling shutter method is an image capturing method in which a start of an exposure period of each of pixel columns is shifted by a predetermined time. In general, the rolling shutter method tends to have a higher frame rate than the global shutter method. Therefore, for the sample observation device whose the resolution of image data is affected by the number of frames during sample scanning, the rolling shutter method has been studied to be adopted.

On the other hand, for the sample observation device, from the viewpoint of shortening the scanning time, so-called bidirectional scanning in which planar light is scanned in a first direction of the sample and then scanned in a second direction opposite to the first direction is studied to be adopted. However, in a case where the rolling shutter method is adopted as the image capturing method, since the exposure position when scanning is performed in the first direction and the exposure position when scanning is performed in the second direction are shifted from each other, it is conceivable that distortion in the opposite direction occurs in the imaged figure of the sample in the image data acquired in each scanning. Such distortion of the imaged figure of the sample causes a difference in distortion of the imaged figure of the sample between the image data, and causes a decrease in analysis accuracy of the shape and the existing position of the sample. In addition, in a case where multi-wavelength measurement using a plurality of excitation wavelengths and fluorescence wavelengths is performed at the time of bidirectional scanning, it is conceivable that color shift may occur in the image of the sample depending on the degree of distortion of the imaged figure of the sample.

The present disclosure has been made to solve the above problems, and an object of the present disclosure is to provide a sample observation device and a sample observation method capable of reducing a difference in distortion of an imaged figure of a sample between image data even in a case where capturing image by a rolling shutter method is adopted.

A sample observation device according to an aspect of the present disclosure includes an irradiation optical system configured to irradiate a sample with planar light, a scanning unit configured to scan the sample in a direction including a first direction and a second direction opposite to the first direction with respect to an irradiation surface of the planar light, an image capturing unit configured to include a pixel region for image capturing observation light generated in the sample by irradiation of the planar light to output image data based on a capturing result of the observation light in the pixel region, and a control unit configured to control respective operations of the irradiation optical system, the scanning unit, and the image capturing unit, in which the image capturing unit includes an area image sensor that performs image capturing by a rolling shutter method in which a start of an exposure period of each of pixel columns in the pixel region is shifted by predetermined time, and the control unit controls the image capturing unit so that an exposure order in each of the pixel columns is reversed between a period in which the scanning unit scans the sample in the first direction and a period in which the scanning unit scans the sample in the second direction.

In this sample observation device, the exposure order in each of the pixel columns is reversed between a period in which the scanning unit scans the sample in the first direction and a period in which the scanning unit scans the sample in the second direction. As a result, the direction of distortion of the imaged figure of the sample can be aligned between the image data acquired in the period for scanning in the first direction and the image data acquired in the period for scanning in the second direction. As a result, even when the capturing image by the rolling shutter method is adopted, it is possible to reduce the difference in distortion of the imaged figure of the sample between the image data.

A control unit may control the irradiation optical system so that the sample is irradiated with the planar light having different wavelengths between the period in which the scanning unit scans the sample in the first direction and the period in which the scanning unit scans the sample in the second direction. In this case, multi-wavelength measurement with planar light of a plurality of wavelengths becomes possible. By aligning the direction of distortion of the imaged figure of the sample by the above-described method, the occurrence of color shift of the image of the sample can be reduced even when the sample is bidirectionally scanned using planar light of a plurality of wavelengths.

The control unit may control the scanning unit so that the sample is scanned with respect to the irradiation surface of the planar light at different scanning speed between the period in which the scanning unit scans the sample in the first direction and the period in which the scanning unit scans the sample in the second direction. In this case, measurement with different scanning conditions is possible. By aligning the direction of distortion of the imaged figure of the sample by the above-described method, it is possible to reduce the difference in distortion of the imaged figure of the sample between the image data even when the sample is scanned using a plurality of scanning conditions.

The control unit may control the image capturing unit so that roll times represented by the time differences of the exposure periods in the pixel columns are different from each other between the period in which the scanning unit scans the sample in the first direction and the period in which the scanning unit scans the sample in the second direction. In this case, measurement with different exposure conditions is possible. By changing the inclination amount of distortion of the imaged figure of the sample by the above-described method, it is possible to adjust the difference in distortion of the imaged figure of the sample between the image data even when the sample is scanned using a plurality of exposure conditions.

The control unit may control at least one of the scanning unit and the image capturing unit such that an absolute value of shift amount of the exposure position in each pixel column is 50% or less of the resolution between the period in which the scanning unit scans the sample in the first direction and the period in which the scanning unit scans the sample in the second direction. By suppressing the absolute value of the shift amount of the exposure position to 50% or less of the resolution, it is possible to avoid the deviation of the analysis position in the sample.

The control unit may control at least one of the scanning unit and the image capturing unit such that an absolute value of the shift amount of the exposure position in each pixel column is 20% or less of the resolution between the period in which the scanning unit scans the sample in the first direction and the period in which the scanning unit scans the sample in the second direction. By suppressing the absolute value of the shift amount of the exposure position to 20% or less of the resolution, it is possible to further reliably avoid the deviation of the analysis position in the sample. In addition, even in the case of performing multi-wavelength measurement, it is possible to reduce the occurrence of color shift of the image of the sample.

The control unit may set a reference pixel column so that the exposure positions of the intermediate pixel columns in the pixel columns coincide with each other when the exposure positions in the pixel columns are overlapped on the scanning axis between the period in which the scanning unit scans the sample in the first direction and the period in which the scanning unit scans the sample in the second direction. By setting the reference pixel column, it is easy to overlap images of the same region of the sample. In addition, even when the scanning speed is different between the period for scanning in the first direction and the period for scanning in the second direction, it is possible to effectively reduce the difference in distortion of the imaged figure of the sample between the image data.

A sample observation method according to an aspect of the present disclosure includes the steps of irradiating a sample with planar light, scanning the sample in a direction including a first direction and a second direction opposite to the first direction with respect to an irradiation surface of the planar light, and image capturing by using a pixel region for image capturing observation light generated in the sample by irradiation of the planar light to output image data based on a capturing result of the observation light in the pixel region, in which the image capturing step uses an area image sensor that performs image capturing by a rolling shutter method in which a start of an exposure period of each of pixel columns in the pixel region is shifted by predetermined time, and the scanning step reverses an exposure order in each of the pixel columns between a period in which the sample is scanned in the first direction and a period in which the sample is scanned in the second direction.

In this sample observation method, the exposure order in each pixel column is reversed between a period for scanning the sample in the first direction and a period for scanning the sample in the second direction. As a result, the direction of distortion of the imaged figure of the sample can be aligned between the image data acquired in the period for scanning in the first direction and the image data acquired in the period for scanning in the second direction. As a result, even when the capturing image by the rolling shutter method is adopted, it is possible to reduce the difference in distortion of the imaged figure of the sample between the image data.

DETAILED DESCRIPTION

Hereinafter, preferred embodiments of a sample observation device and a sample observation method according to one aspect of the present disclosure will be described in detail with reference to the drawings.

Figure 1:
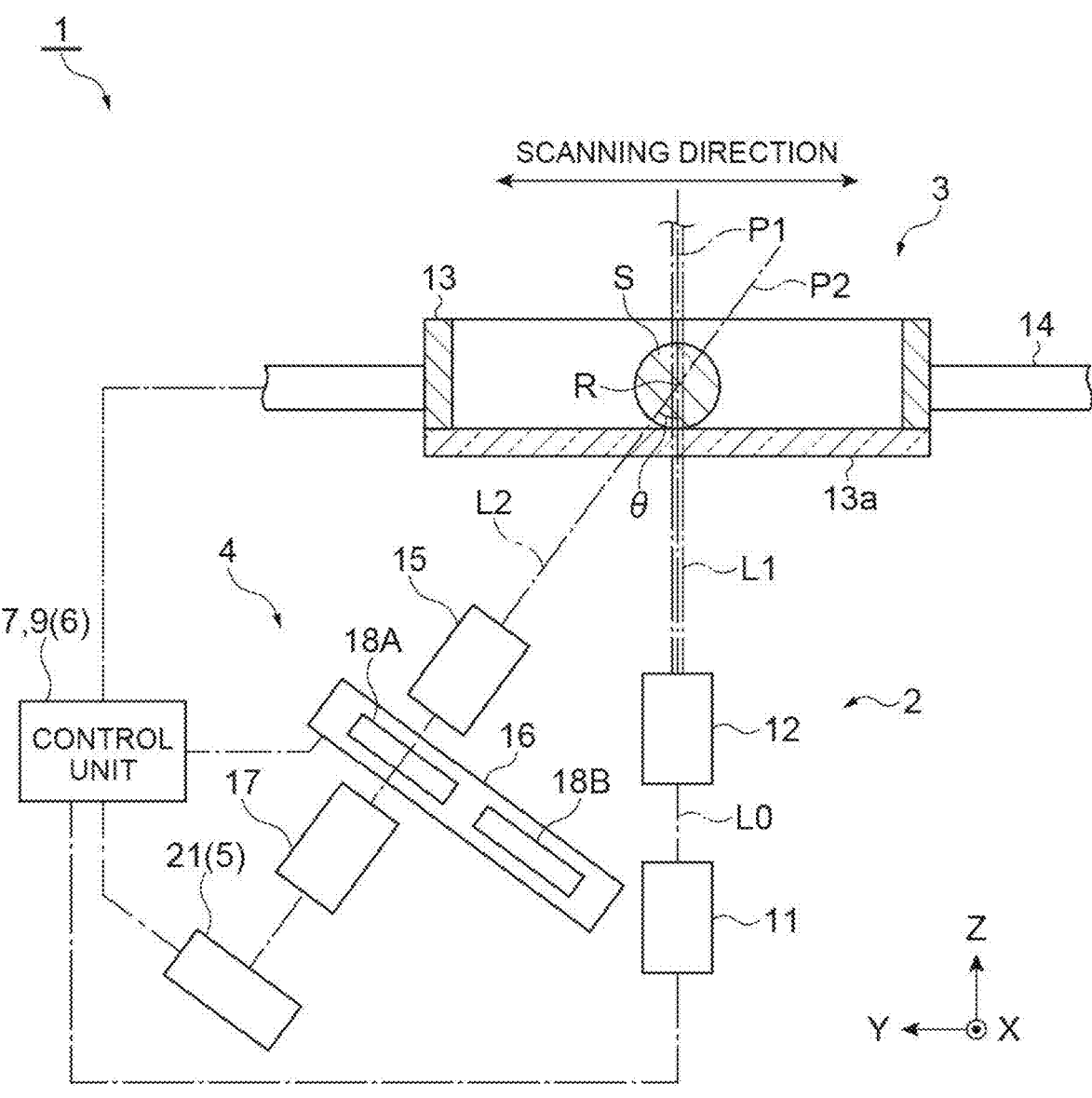
FIG. 1 is a schematic configuration diagram illustrating a sample observation device according to an embodiment of the present disclosure.

FIG. 1 is a schematic configuration diagram illustrating a sample observation device according to an embodiment of the present disclosure. A sample observation device 1 illustrated in FIG. 1 is configured as a device that irradiates a sample S with planar light L1 and captures fluorescence or scattered light generated inside the sample S to acquire observation image data inside the sample S.

Examples of the sample observation device 1 of this type include a slide scanner that acquires and displays an image of the sample S held on a slide glass, a plate reader that acquires image data of the sample S held on a microplate and analyzes the image data, and the like. Examples of the sample S to be observed include human or animal cells, tissues, organs, animals or plants themselves, and plant cells and tissues. In addition, the sample S may be contained in a solution, a gel, or a substance having a refractive index different from that of the sample S.

As illustrated in FIG. 1, the sample observation device 1 includes an irradiation optical system 2, a scanning unit 3, an imaging optical system 4, an image capturing unit 5, and a control unit 6. The irradiation optical system 2 is an optical system that irradiates the sample S with the planar light L1. The irradiation optical system 2 includes a light source 11 that outputs light L0 that is a generation source of the planar light L1, and a light shaping element 12 that shapes the light L0 into the planar light L1 and irradiates the sample S with the shaped planar light L1 along the optical axis P1.

Examples of the light source 11 include laser light sources such as laser diodes and solid-state laser light sources. The light source 11 may be a light emitting diode, a superluminescent diode, or a lamp-based light source. The light L0 output from the light source 11 is guided to the light shaping element 12.

Examples of the light shaping element 12 include a cylindrical lens, an axicon lens, a spatial light modulator, and the like. The light shaping element 12 may include an objective lens. The light shaping element 12 may include an objective scanner. In this case, the light shaping element 12 may optically scan the linear light L0 output from the light source 11 to form the planar light L1. In the sample S irradiated with the planar light L1 generated by the light shaping element 12, observation light L2 is generated on an irradiation surface R of the planar light L1. The observation light L2 is, for example, fluorescence excited by the planar light L1, scattered light of the planar light L1, or diffusely reflected light of the planar light L1.

A scanning unit 3 is a mechanism that scans the sample S with respect to the irradiation surface R of the planar light L1. The scanning unit 3 includes a container 13 that holds the sample S and a stage 14 that moves the container 13. The container 13 is, for example, a microplate, a slide glass, a petri dish, or the like. A bottom surface 13a of the container 13 is an input surface of the planar light L1. It is made of a transparent member having transparency to the planar light L1. Examples of the constituent material of the bottom surface 13a include glass, quartz, a rigid resin, and the like.

The stage 14 holds the container 13 and scans the container 13 in a preset direction. The stage 14 scans the container 13 in one direction in a plane orthogonal to the optical axis P1 of the planar light L1. In the present embodiment, the stage 14 is capable of bidirectional scanning, and scans the container 13 in a direction including a first direction and a second direction opposite to the first direction with respect to the irradiation surface R of the planar light L1.

In the following description, an orthogonal coordinate system including X, Y, and Z axes orthogonal to each other is used for convenience (see FIG. 1). In the present embodiment, a direction along the optical axis P1 of the planar light L1 is defined as a Z axis, a scanning direction of the sample S (container 13) by the stage 14 is defined as a Y axis, and a direction orthogonal to the Y axis in a plane orthogonal to the optical axis P1 of the planar light L1 is defined as an X axis.

In a case where the light shaping element 12 includes an optical scanner, the linear light L0 output from the light source 11 in the Z direction is optically scanned in the X direction to form the planar light L1. According to the above definition, the irradiation surface R of the planar light L1 with respect to the sample S is a surface in the XZ plane. The depth direction of the sample S corresponds to the Z direction. Of the scanning direction of the container 13 by the stage 14, the first direction is the +Y direction, and the second direction is the −Y direction. An operation of moving the container 13 in the X direction may be performed between scanning in the first direction and scanning in the second direction.

The imaging optical system 4 is an optical system that images the observation light L2 generated in the sample S by irradiation with the planar light L1. The imaging optical system 4 includes, for example, an objective lens 15, a filter switching unit 16, and an imaging lens 17. The filter switching unit 16 is a filter wheel used for multi-wavelength measurement of the sample S, and holds a first filter 18A and a second filter 18B. The filter switching unit 16 is disposed on an imaging optical path between the objective lens 15 and the imaging lens 17, and causes any one of the first filter 18A and the second filter 18B to be disposed on the imaging optical path. The first filter 18A and the second filter 18B transmit a part of the observation light L2 (for example, fluorescence of a specific wavelength) according to optical characteristics thereof.

The optical axis of the imaging optical system 4 is an observation axis P2 of the observation light L2. In the present embodiment, the observation axis P2 is inclined at a predetermined angle θ with respect to the irradiation surface R of the planar light L1. The angle θ also coincides with an angle formed by the optical axis P1 and the observation axis P2 of the planar light L1. The angle θ is, for example, 10° to 80°. From the viewpoint of improving the resolution of the observation image, the angle θ may be 20° to 70°. The angle θ may be 30° to 65° from the viewpoint of improving the resolution of the observation image and the stability of the visual field.

The observation axis P2 is not necessarily inclined with respect to the irradiation surface R of the planar light L1. That is, the observation axis P2 may be orthogonal to the irradiation surface R of the planar light L1 (the optical axis P1 of the planar light L1).

Figure 2:
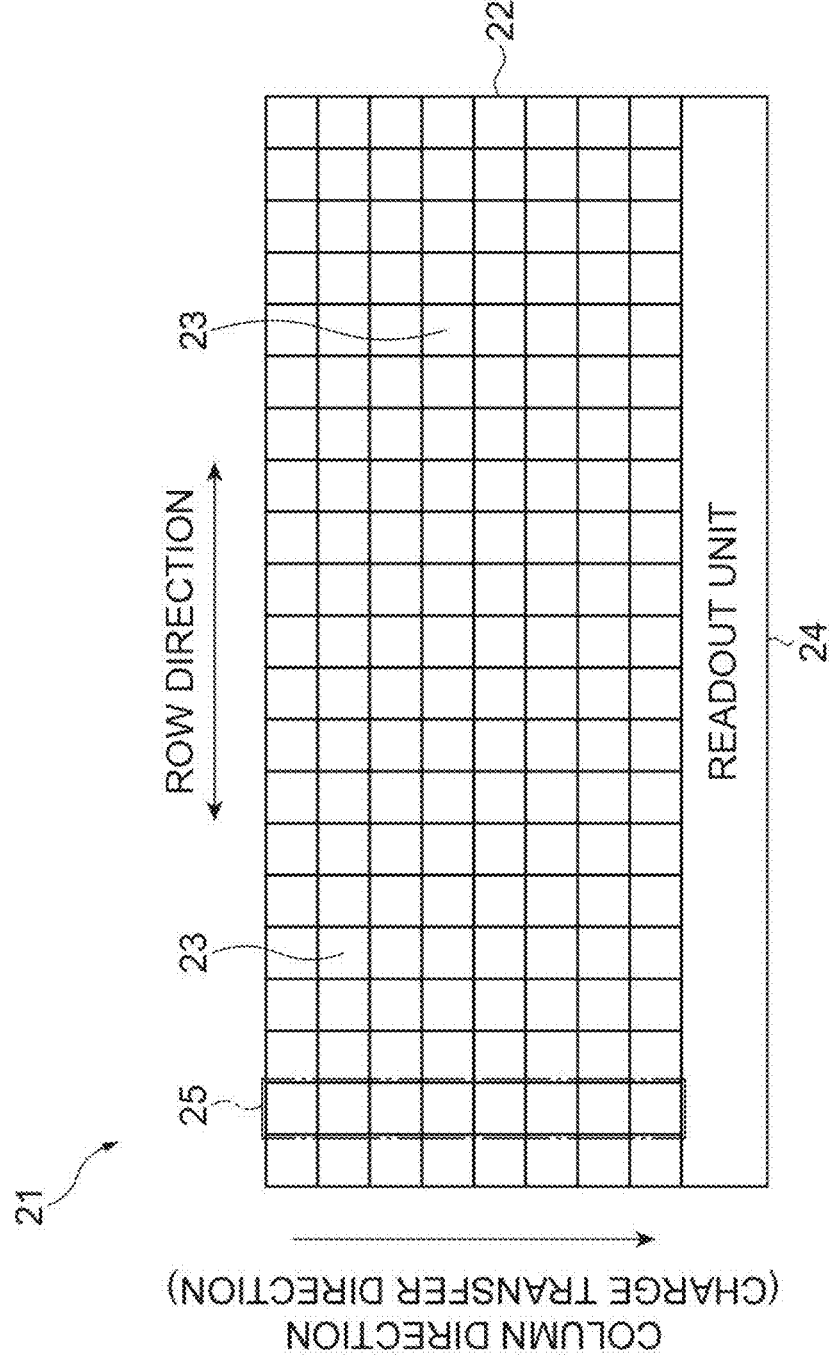
FIG. 2 is a schematic diagram illustrating a capturing region of an image capturing unit.

The image capturing unit 5 is a part that captures the observation light L2 generated in the sample S by irradiation with the planar light L1. The image capturing unit 5 include an area image sensor 21 such as a CMOS image sensor and a CCD image sensor, for example. The area image sensor 21 is disposed on the imaging plane of the imaging optical system 4. For example, as illustrated in FIG. 2, the area image sensor 21 includes a pixel region 22 including a plurality of pixels 23, and a readout unit 24 that externally reads out charge accumulated in each pixel 23 out. The area image sensor 21 captures an optical image of the observation light L2 by a rolling shutter method in which the start of the exposure periods of the pixel columns 25 in the pixel region 22 (see FIG. 2) is shifted by predetermined time, and generates image data based on the capturing result.

The control unit 6 physically includes a memory such as a RAM and a ROM, a processor such as a CPU, a communication interface, a storage unit such as a hard disk, a display, and the like. Configuration examples of the control unit 6 include a personal computer, a cloud server, and a smart device (smartphone, tablet terminal). The control unit 6 functions as an operation control unit 7 that controls the operations of the light source 11, the stage 14, the filter switching unit 16, and the image capturing unit 5 by executing a program stored in the memory by a processor such as a CPU.

The control unit 6 as the operation control unit 7 receives an input of operation of starting measurement by the user, and drives the light source 11, the light shaping element 12, the stage 14, the filter switching unit 16, and the image capturing unit 5. In addition, output conditions (wavelength or the like) of the light L0 by the light source 11, scanning conditions (scanning speed or the like) of the sample S by the stage 14, and image capturing conditions (exposure period, resolution, etc.) by the image capturing unit 5 are controlled according to settings input in advance. In a case where the light shaping element 12 includes an optical scanner, the operation control unit 7 controls the operation of the optical scanner of the light shaping element 12.

A control unit 6 may control the irradiation optical system 2 so that the sample S is irradiated with the planar light L1 having different wavelengths between the period in which the scanning unit 3 scans the sample S in the first direction and the period in which the scanning unit 3 scans the sample S in the second direction. The control unit 6 may control the scanning unit 3 so that the sample S is scanned with respect to the irradiation surface R of the planar light L1 at different scanning speed V1 and V2 between the period in which the scanning unit 3 scans the sample S in the first direction and the period in which the scanning unit 3 scans the sample S in the second direction. The control unit 6 may control the image capturing unit 5 so that roll times Tr (see FIG. 3A) represented by the time differences in the start of the exposure periods T in the pixel columns 25 are different from each other between the period in which the scanning unit 3 scans the sample S in the first direction and the period in which the scanning unit 3 scans the sample S in the second direction.

The control unit 6 also functions as an analysis unit 9 that analyzes the sample S. The control unit 6 as the analysis unit 9 generates observation image data of the sample S on the basis of the image data generated by the image capturing unit 5. The observation image data is, for example, a cross-sectional image of the sample S on a plane (XZ plane) orthogonal to the optical axis P1 of the planar light L1. By combining these cross-sectional images in the scanning direction (Y direction) of the sample S, three-dimensional information of the sample S can be obtained. The control unit 6 as the analysis unit 9 analyzes the sample S on the basis of the generated observation image data to generate an analysis result. The analysis result is displayed on the display as necessary and stored in the storage unit.

Next, an image capturing method of the image capturing unit 5 in the sample observation device 1 will be described in more detail.

Figure 3A:
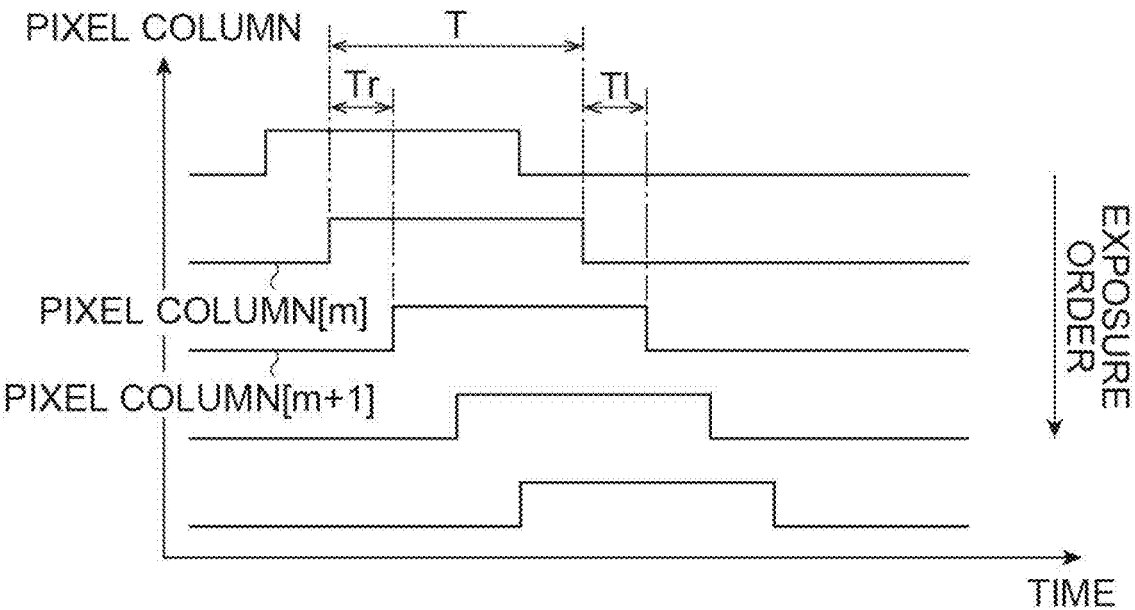
FIG. 3A is a schematic diagram illustrating exposure periods of pixels according to a general rolling shutter method.

As described above, the image capturing unit 5 in the sample observation device 1 includes the area image sensor 21 such as a CMOS image sensor or a CCD image sensor, and the rolling shutter method is adopted as the image capturing method. In general, in the rolling shutter method, as illustrated in FIG. 3A, the start of the exposure periods T of the pixel columns 25 in the pixel region 22 is shifted by predetermined time. That is, after a predetermined time has elapsed since the exposure of one pixel column 25 was instructed, the exposure of the next pixel column 25 is started, and then the exposure period T is sequentially started until the desired pixel column 25 is reached.

Figure 3B:
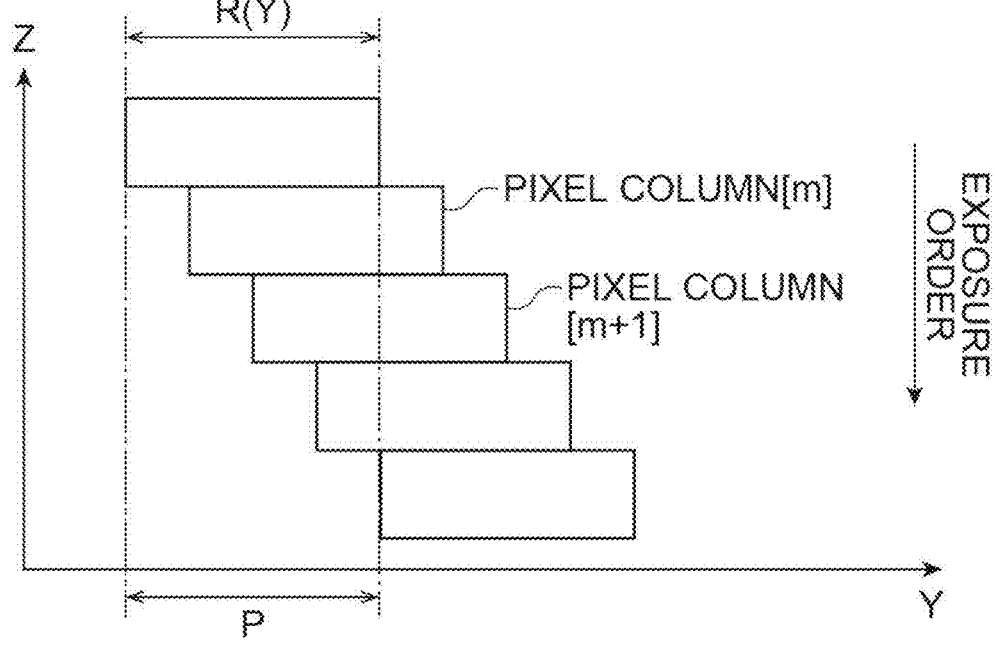
FIG. 3B is a schematic diagram illustrating exposure positions of pixels in a scanning direction according to a general rolling shutter method.

The time difference in the start of the exposure periods T in the pixel columns 25 is referred to as roll time Tr and is a parameter that can be controlled by the control unit 6. As illustrated in FIG. 3B, the resolution R(Y) in the Y direction in each pixel column 25 can be calculated based on the product of the exposure period T and the scanning speed V of the sample S. The shift amount of the exposure position P of each pixel column 25 is proportional to the scanning speed V of the sample S at the time of image capturing.

In image capturing by the general rolling shutter method, each frame includes an exposure period and a readout period. The time difference in the start of the readout period in each pixel column 25 is referred to as line time Tl (see FIG. 3A). The line time Tl is a parameter that can be controlled by the control unit 6, similarly to the roll time Tr. In the present embodiment, the roll time Tr and the line time Tl are set to equal values. Furthermore, in general, in a predetermined frame, after the exposure period T of a predetermined pixel column 25 has elapsed, the readout period of the pixel column 25 is started at the end of the exposure. Then, after the elapse of the readout period of the predetermined pixel column 25 in the predetermined frame, the exposure of the predetermined pixel column 25 in the next frame is started at the end of the readout.

In the present embodiment, various image capturing modes by the rolling shutter method can be applied. For example, the image capturing unit 5 may perform an image capturing by the rolling shutter method in an image capturing mode in which starting the exposure is controlled on the basis of a trigger signal. The image capturing unit 5 may perform an image capturing by the rolling shutter method in an image capturing mode in which starting the exposure and the exposure period are controlled on the basis of a trigger signal. The image capturing unit 5 may perform an image capturing by the rolling shutter method in an image capturing mode in which starting the readout is controlled on the basis of a trigger signal. The image capturing unit 5 may perform an image capturing by the rolling shutter method in an image capturing mode in which starting the readout and the readout period are controlled on the basis of a trigger signal.

Figures 4A, 4B:
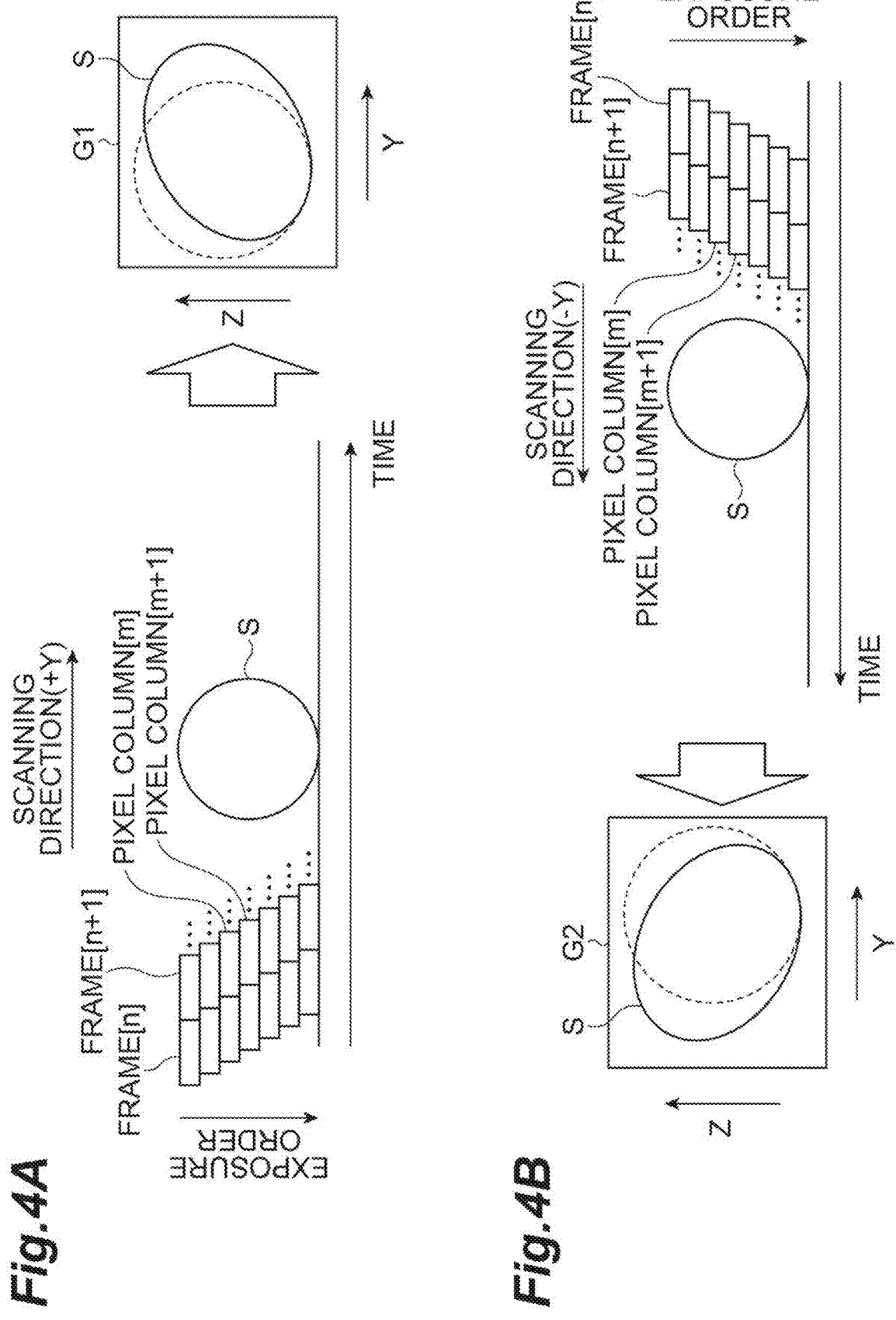
FIG. 4A is a schematic diagram (comparative example) illustrating a state of acquisition of an image of a sample in a period for scanning in a first direction.
FIG. 4B is a schematic diagram (comparative example) illustrating a state of acquisition of an image of a sample in a period for scanning in a second direction.

FIGS. 4A and 4B illustrate a comparative example of the relationship between the shift amount of the exposure position P and the image of the sample S in the obtained image data. The example of FIG. 4A is a schematic diagram illustrating a state of acquisition of an image of the sample S in a period for scanning in the first direction (+Y direction). As illustrated in the drawing, in image capturing the sample S in the period for scanning in the first direction (+Y direction), exposure is performed by each pixel column 25 in the order of the nth frame, the (n+1)th frame, and so on.

The exposure order of the pixel columns 25 in each frame is arranged from a smaller column number to a larger column number. That is, the start of the exposure period T of the pixel column 25 in the mth column is temporally earlier than the start of the exposure period T of the pixel column 25 in the (m+1) th column by the roll time Tr. In the image data acquired in this state, the exposure position P of the sample S corresponding to the exposure period T gradually shifts in the Y direction with respect to the position in the Z direction. Therefore, an imaged figure of the sample S is distorted in the Y direction with respect to the position in the Z direction (depth direction), with respect to the original existing position of the sample S.

In addition, the example of FIG. 4B is a schematic diagram illustrating a state of acquisition of an image of the sample S in a period for scanning in the second direction (−Y direction). As illustrated in the drawing, in image capturing the sample S, exposure is performed by each pixel column 25 in the order of the nth frame, the (n+1) th frame, and so on. As illustrated in the drawing, in image capturing the sample S during the period for scanning in the second direction (−Y direction), exposure is performed by each pixel column 25 in the order of the nth frame, the (n+1)th frame, and so on, similarly to the case of FIG. 4A.

The exposure order of the pixel columns 25 in each frame is arranged from a smaller column number to a larger column number, as similar to the case of FIG. 4A. That is, the start of the exposure period T of the pixel column 25 in the mth column is temporally earlier than the start of the exposure period T of the pixel column 25 in the (m+1) th column by the roll time Tr. In the image data G2 acquired in this state, the exposure position P corresponding to the exposure period T gradually shifts in the Y direction (one direction opposite to the case in FIG. 4A) with respect to the position in one direction of the Z direction (depth direction of the sample S). Therefore, the imaged figure of the sample S is distorted in the Y direction in opposite direction to the case in FIG. 4A (one direction opposite to the case in FIG. 4A) with respect to the position in the Z direction (depth direction of the sample S), with respect to the original existing position of the sample S.

Figure 5:
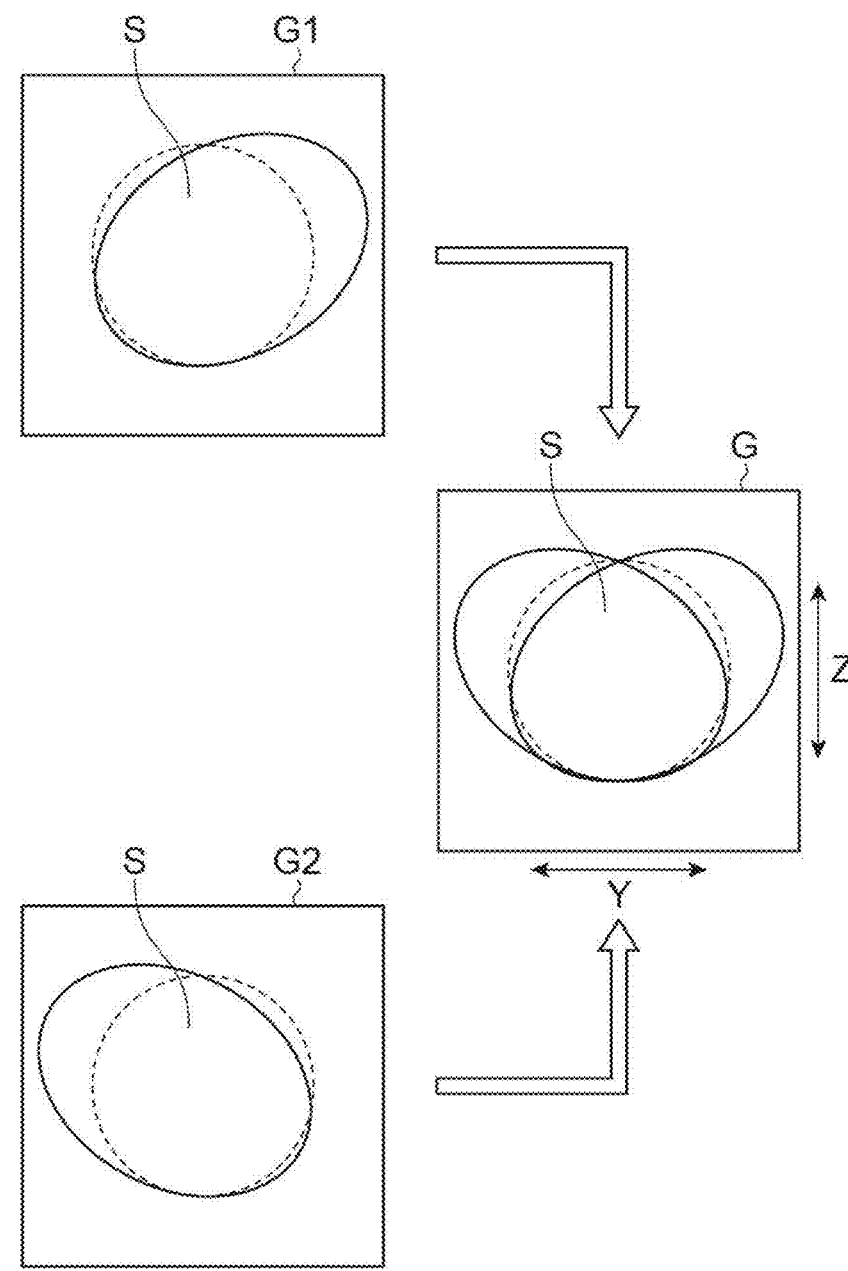
FIG. 5 is a schematic diagram illustrating a state of overlapping of image data acquired in the comparative example illustrated in FIGS. 4A and 4B.

In the image data G in which the image data G1 of the sample S acquired in the example of FIG. 4A and the image data G2 of the sample S acquired in the example of FIG. 4B are superimposed on each other, as illustrated in FIG. 5, the images overlap each other in the vicinity of the bottom surface of the sample S in the depth direction, but the shift amount of the imaged figure of the sample S increases in the vicinity of the end portion of the sample S in the depth direction due to the opposite direction of the distortion in the Y direction.

Figure 6:
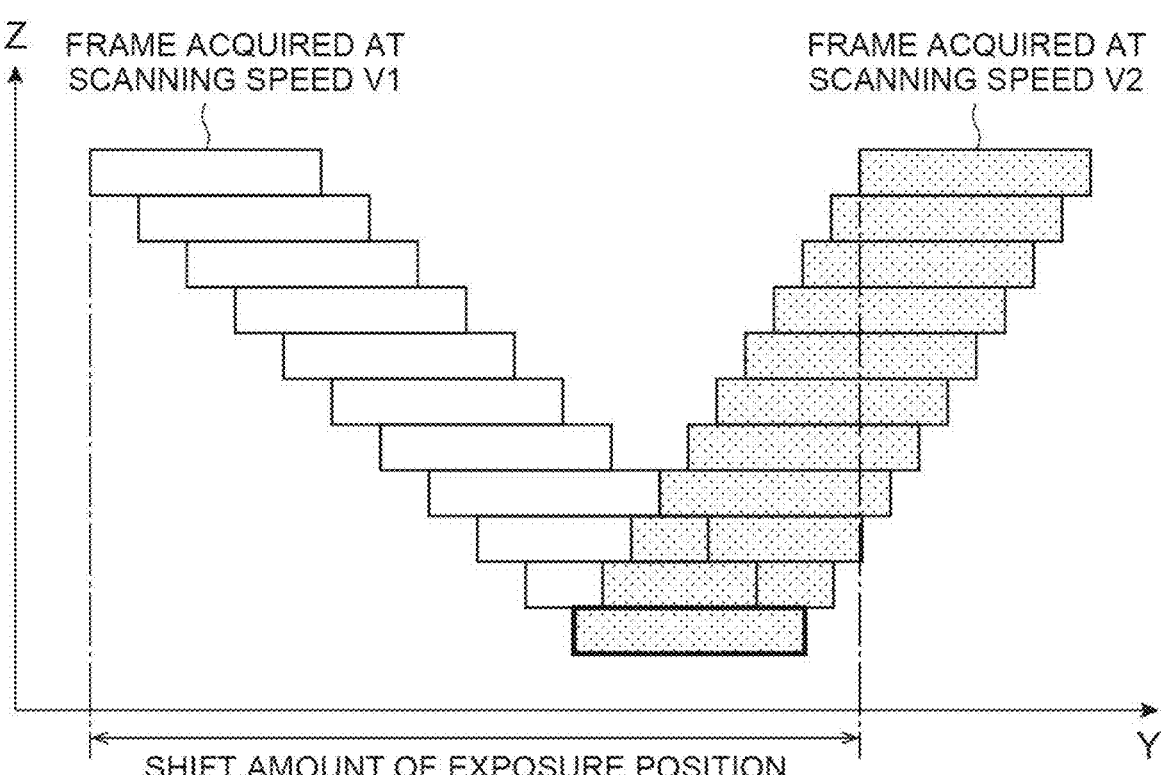
FIG. 6 is a schematic diagram illustrating a positional relationship between an exposure position in a scanning direction in the period for scanning in the first direction and an exposure position in a scanning direction in the period for scanning in the second direction in the comparative example illustrated in FIGS. 4A and 4B.

FIGS. 4A and 4B illustrate the case where the scanning speed V1 in the first direction is equal to the scanning speed V2 in the second direction. However, as illustrated in FIG. 6, the shift amount of the imaged figure of the sample S in the image data G becomes more remarkable and asymmetric as the difference between the scanning speed V1 and the scanning speed V2 increases. In addition, in the sample observation device 1, since the filter switching unit 16 can switch between the first filter 18A and the second filter 18B, it is also assumed that multi-wavelength measurement using a plurality of excitation wavelengths and fluorescence wavelengths is performed at the time of bidirectional scanning.

In the multi-wavelength measurement, the observation light L2 having different wavelengths is imaged between the period of scanning in the first direction and the period of scanning in the second direction. For this reason, as illustrated in FIG. 5, when the image of the sample S is distorted in the opposite direction in the image data G, a color shift may occur in the imaged figure of the sample S among a portion where the images overlap, a portion where the images do not overlap and are shifted in one direction, and a portion where the images do not overlap and are shifted in the opposite direction.

Figure 7:
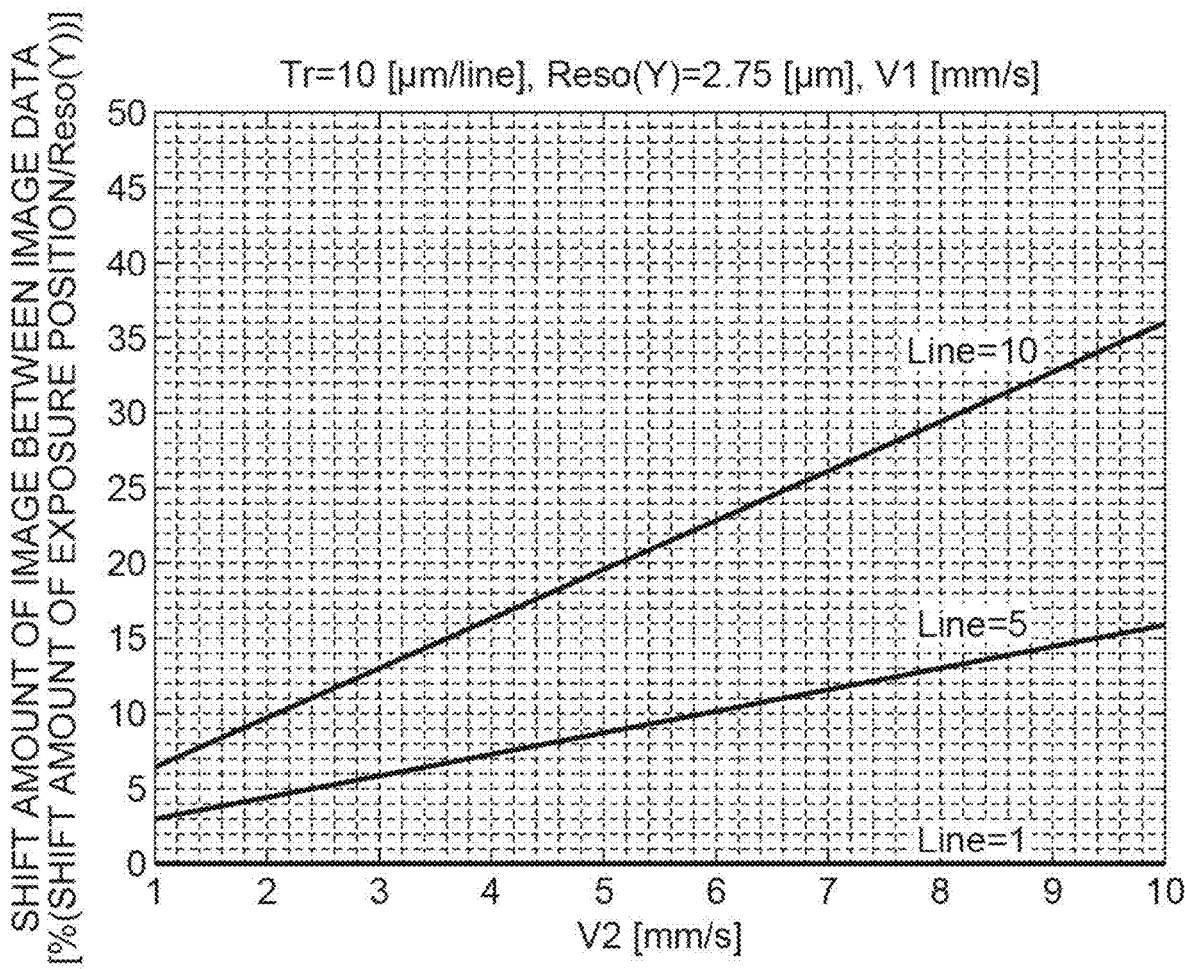
FIG. 7 is a diagram illustrating a relationship between scanning speed and shift amount of the imaged figure between image data in the comparative example.

FIG. 7 is a diagram illustrating a relationship between the scanning speed and the shift amount of the imaged figure between image data in the comparative example. In FIG. 7, the roll time Tr is set to 10 [μs/line], the resolution R(Y) is set to 2.75 [μm], the scanning speed V1 with respect to the first direction is set to 1 [mm/s], and what is plotted is the shift amount of the imaged figure between the image data [% (=shift amount of exposure position/R(Y))] when the scanning speed V2 with respect to the second direction is changed. From the results in the drawing, it can be seen that, in the comparative example, the shift amount of the imaged figure between the image data is theoretically 0 in the first pixel column 25 in which there is no shift at the timing of starting the exposure period T, but the shift amount of the imaged figure between the image data increases in proportion to the difference between the scanning speed V1 and the scanning speed V2 in the other pixel columns 25. Furthermore, in the comparative example, it can be seen that, in a case where the difference between the scanning speed V1 and the scanning speed V2 is the same, as the column number of the pixel column 25 increases (the exposure order goes later), the shift amount of the imaged figure between the image data increases.

Figures 8A, 8B:
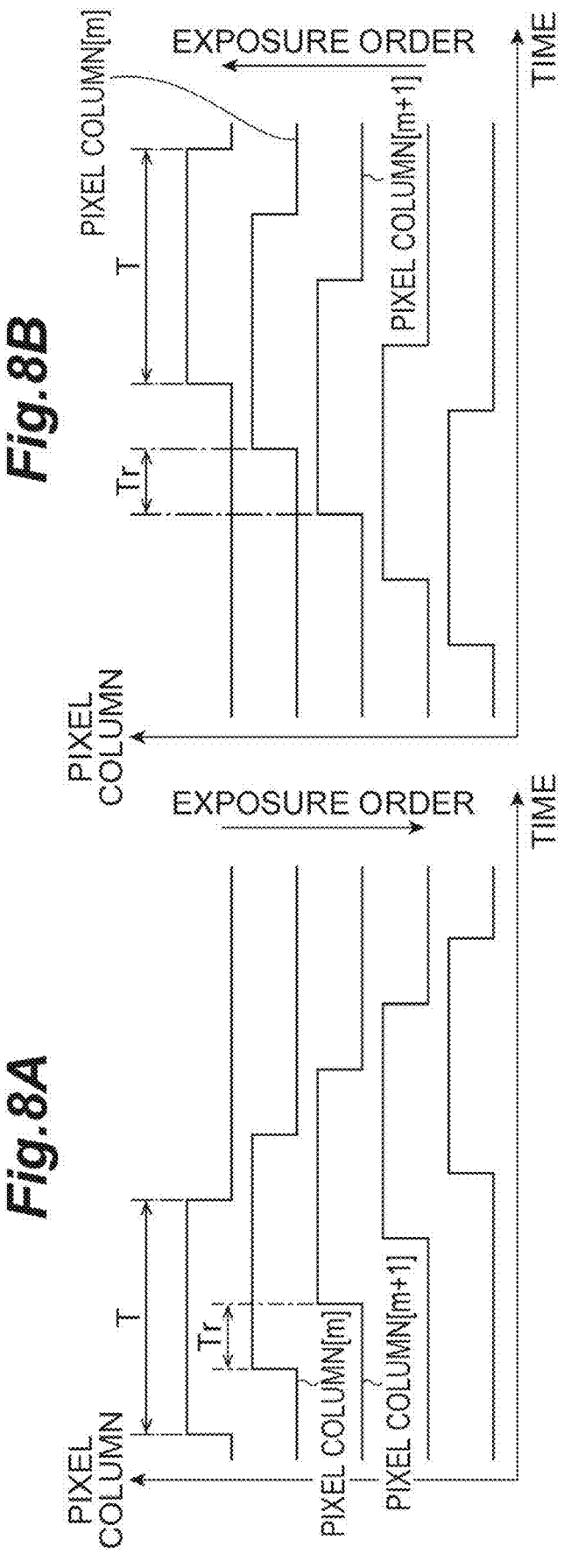
FIG. 8A is a schematic diagram (Examples) illustrating exposure periods of pixels according to the rolling shutter method in the period for scanning in the first direction.
FIG. 8B is a schematic diagram (Examples) illustrating exposure periods of pixels according to the rolling shutter method in the period for scanning in the second direction.

In contrast to such comparative example, in the present embodiment, the control unit 6 controls the image capturing unit 5 so that the exposure order of the pixel columns 25 is reversed between the period in which the scanning unit 3 scans the sample S in the first direction and the period in which the scanning unit 3 scans the sample S in the second direction. More specifically, in the period in which the scanning unit 3 scans the sample S in the first direction, as illustrated in FIG. 8A, the exposure order of the pixel columns 25 in each frame is arranged from the smaller column number to the larger column number. That is, the start of the exposure period T of the pixel column 25 in the mth column is temporally earlier than the start of the exposure period T of the pixel column 25 in the (m+1) th column by the roll time Tr.

On the other hand, in the period in which the scanning unit 3 scans the sample S in the second direction, as illustrated in FIG. 8B, the exposure order of the pixel columns 25 in each frame is reversed and arranged from the larger column number to the smaller column number. That is, the start of the exposure period T of the pixel column 25 in the (m+1)th column is temporally earlier than the start of the exposure period T of the pixel column 25 in the mth column by the roll time Tr.

Figures 9A, 9B:
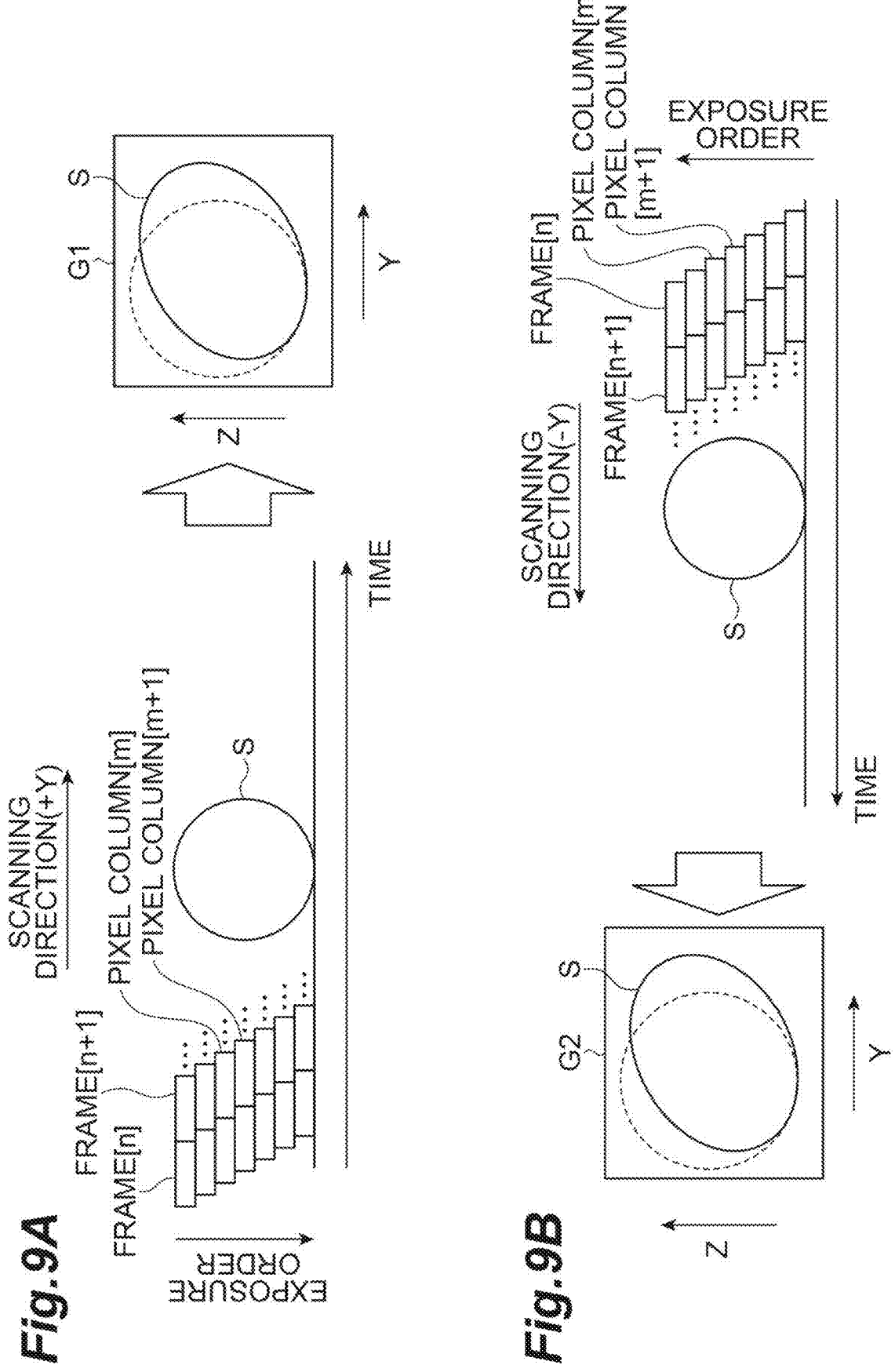
FIG. 9A is a schematic diagram (Example) illustrating a state of acquisition of an image of a sample in the period for scanning in the first direction.
FIG. 9B is a schematic diagram (Examples) illustrating a state of acquisition of an image of a sample in the period for scanning in the second direction.

In the image data G1 acquired in the state of FIG. 8A, as illustrated in FIG. 9A, the exposure position P corresponding to the exposure period T gradually shifts in the Y direction with respect to the position in one direction of the Z direction (depth direction of the sample S). Therefore, similarly to the case of FIG. 4A, the imaged figure of the sample S is distorted in the Y direction with respect to the position in the Z direction (depth direction), with respect to the original existing position of the sample S. On the other hand, in the image data G2 acquired in the state of FIG. 8B, as illustrated in FIG. 9B, the exposure position P corresponding to the exposure period T gradually shifts in the Y direction (the one direction same as the case of FIG. 9A) with respect to the position in one direction of the Z direction (depth direction of the sample S). Therefore, the imaged figure of the sample S is distorted in the Y direction, which is the same direction as the case of FIG. 9A, with respect to the position in the Z direction (depth direction of the sample S), with respect to the original existing position of the sample S.

Figure 10:
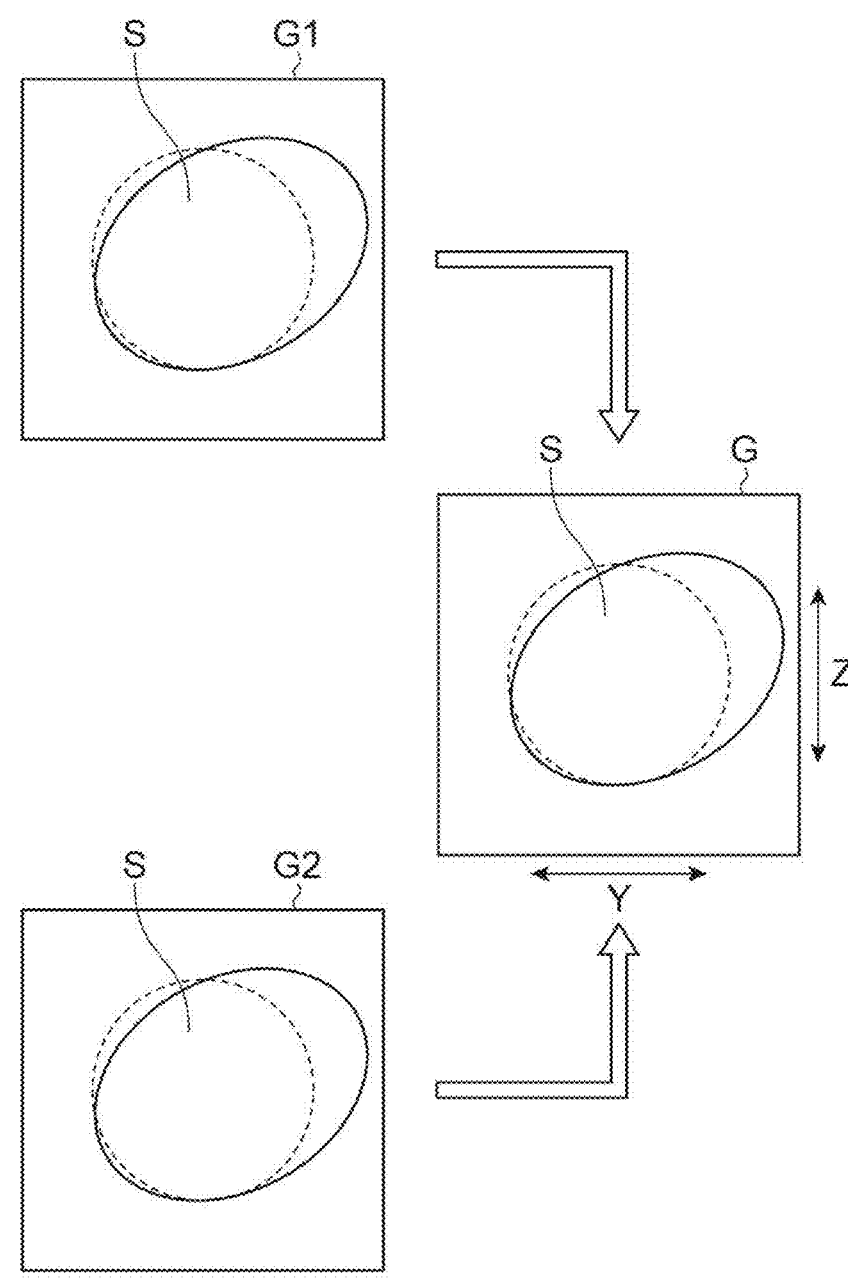
FIG. 10 is a schematic diagram illustrating a state of overlapping of image data acquired in Examples illustrated in FIGS. 9A and 9B.
Figure 11:
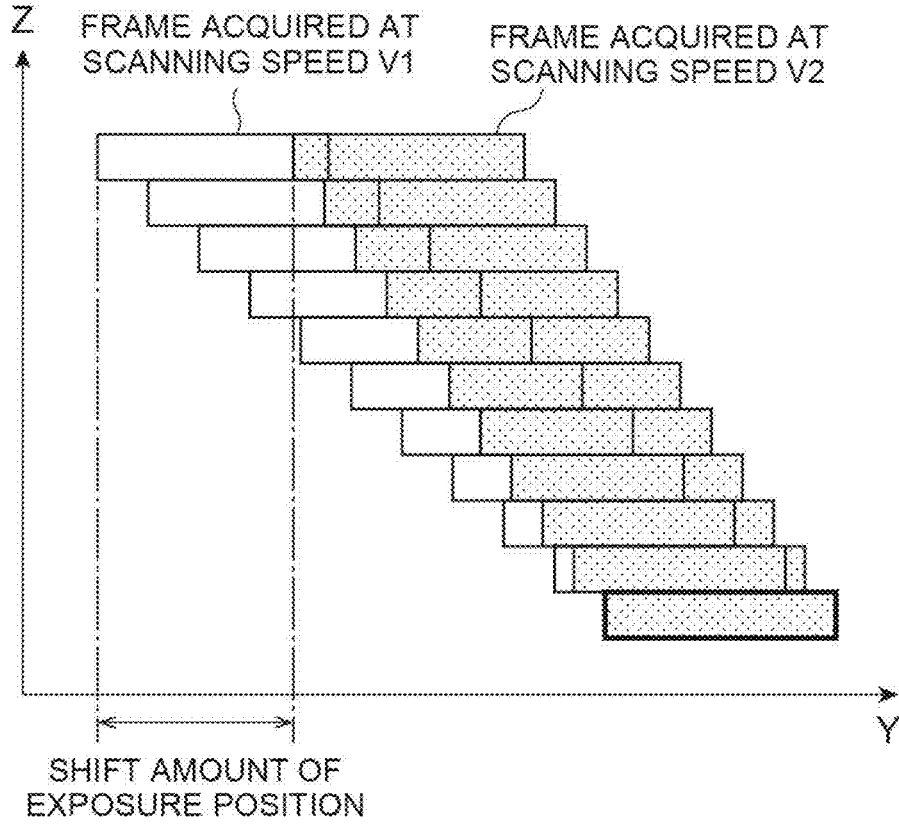
FIG. 11 is a schematic diagram illustrating a positional relationship between an exposure position in a scanning direction in the period for scanning in the first direction and an exposure position in a scanning direction in the period for scanning in the second direction in Examples illustrated in FIGS. 9A and 9B.

In the image data G in which the image data G1 of the sample S acquired in the example of FIG. 9A overlaps the image data G2 of the sample S acquired in the example of FIG. 9B, as illustrated in FIG. 10, although the imaged figure of the sample S is distorted with respect to the original existing position of the sample S, the distortion direction in the Y direction is aligned, thereby reducing the shift of the imaged figure of the sample S between the image data G1 and G2. The effect of reducing the shift of the imaged figure of the sample S in the present embodiment is remarkably exhibited even when there is a difference between the scanning speed V1 and the scanning speed V2 as illustrated in FIG. 11. In the multi-wavelength measurement, as illustrated in FIG. 10, the direction of the distortion of the imaged figure of the sample S is aligned in the overlapping image data G, thereby suppressing the occurrence of the color shift in the image of the sample S.

Figure 12:
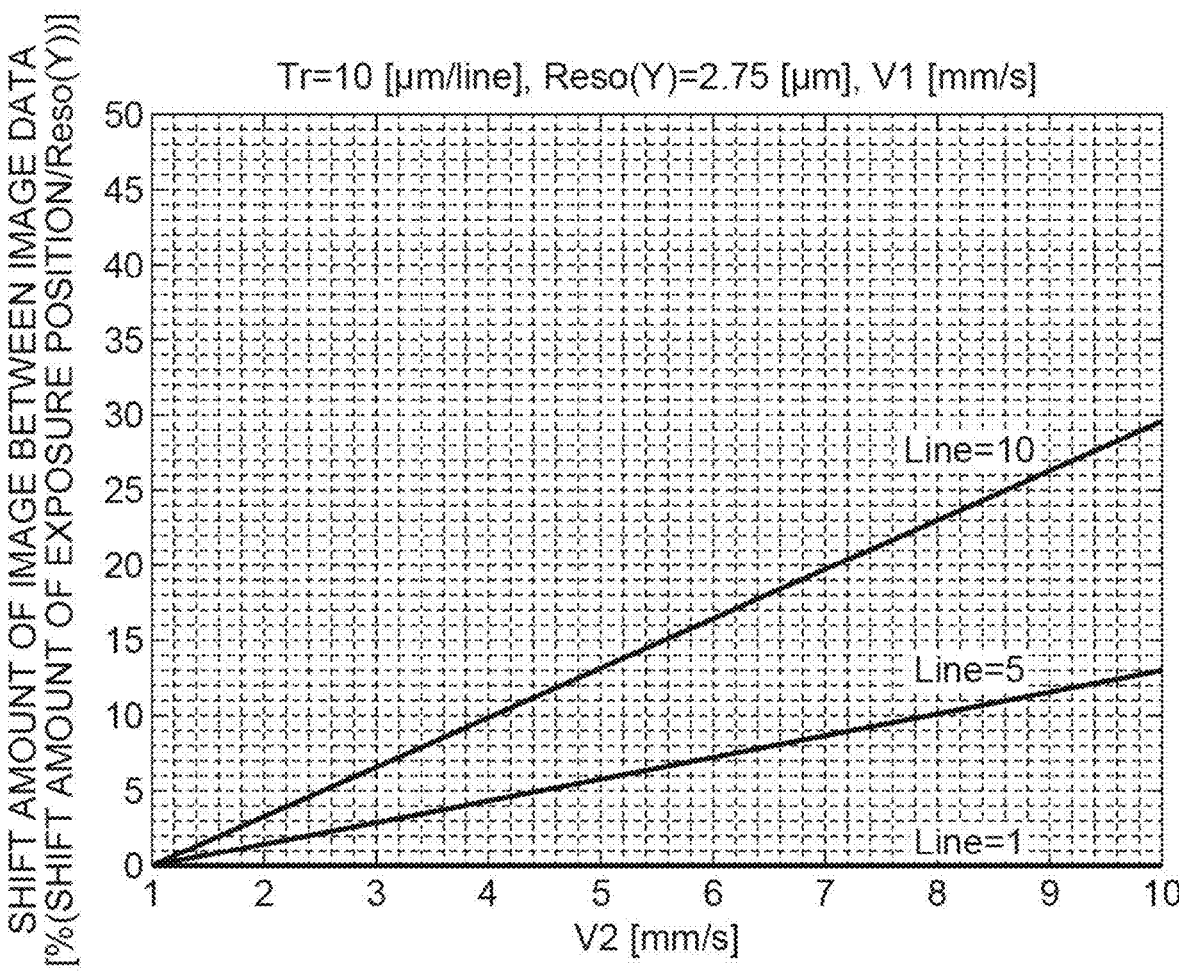
FIG. 12 is a diagram illustrating a relationship between scanning speed and shift amount of the imaged figure between image data in Examples.

FIG. 12 is a diagram illustrating a relationship between the scanning speed and the shift amount of the imaged figure between image data in Examples. In FIG. 12, similarly to FIG. 7, the roll time Tr is set to 10 [μs/line], the resolution R(Y) is set to 2.75 [μm], the scanning speed V1 with respect to the first direction is set to 1 [mm/s], and what is plotted is the shift amount of the imaged figure between the image data [% (=shift amount of exposure position/R(Y))] when the scanning speed V2 with respect to the second direction is changed. From the results in the drawing, Example is the same as the comparative example in that the shift amount of the imaged figure between the image data increases in proportion to the difference between the scanning speed V1 and the scanning speed V2, but it can be seen that the shift amount of the imaged figure between the image data is reduced as compared with the case of FIG. 7.

There is a tendency that if the absolute value of the shift amount of the imaged figure between the image data G1 and G2 with respect to the resolution R exceeds 50%, it is difficult to maintain the analysis accuracy of the shape and the existing position of the sample. In addition, in a case where the absolute value of the shift amount of the imaged figure between the image data G1 and G2 with respect to the resolution R exceeds 20%, a problem of color shift of the image in multi-wavelength measurement remarkably appears. Therefore, in the sample observation device 1, the control unit 6 controls at least one of the scanning unit 3 and the image capturing unit 5 such that an absolute value of the shift amount of the exposure position P in each pixel column 25 is 50% or less of the resolution between the period in which the scanning unit 3 scans the sample S in the first direction and the period in which the scanning unit 3 scans the sample S in the second direction. Particularly, when performing the multi-wavelength measurement, the control unit 6 controls at least one of the scanning unit 3 and the image capturing unit 5 such that an absolute value of the shift amount of the exposure position P in each pixel column 25 is 20% or less of the resolution between the period in which the scanning unit 3 scans the sample S in the first direction and the period in which the scanning unit 3 scans the sample S in the second direction. Examples of the control parameters in this case include scanning speed V1 and V2, roll time Tr, and an exposure period T.

Figure 13:
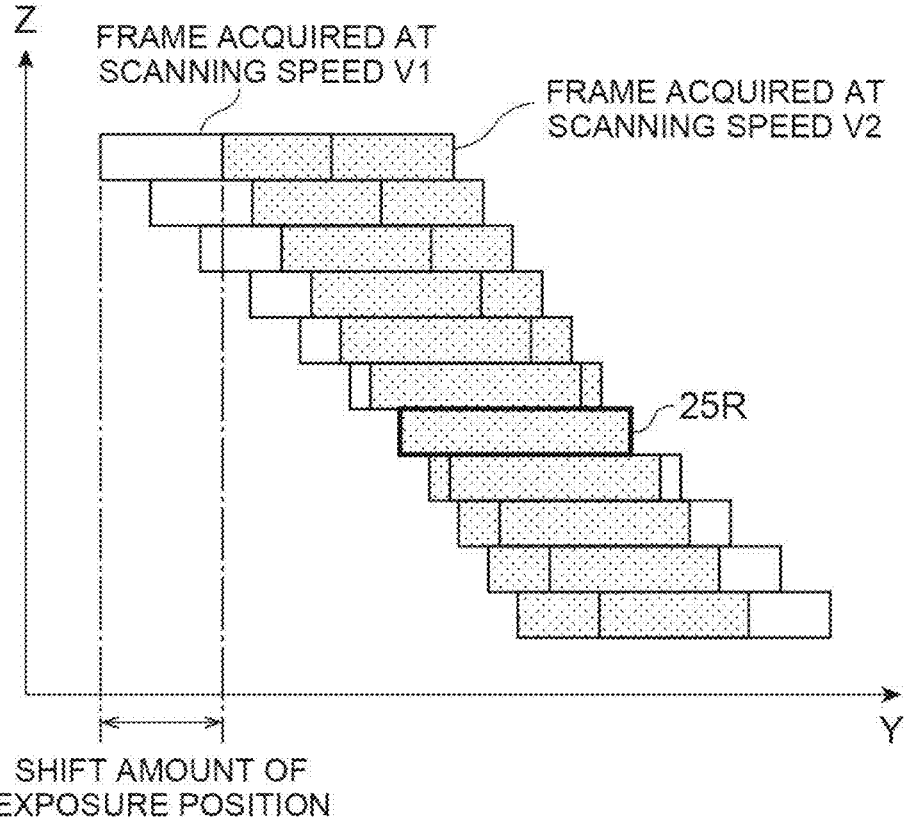
FIG. 13 is a schematic diagram illustrating a setting example of a reference pixel column.

In a case where the scanning speed V1 and V2 are different from each other, from the viewpoint of further reducing the difference in distortion of the imaged figure of the sample S between the image data G1 and G2, the control unit 6 may set the reference pixel column 25R so that the exposure positions P of the intermediate pixel columns in the pixel columns 25 coincide with each other when the exposure positions P in the pixel columns 25 are overlapped on the scanning axis between the period in which the scanning unit 3 scans the sample S in the first direction and the period in which the scanning unit 3 scans the sample S in the second direction as illustrated in FIG. 13.

The reference pixel column 25R is arbitrarily selected from the intermediate pixel columns excluding the array ends. In the example of FIG. 13, in the first to eleventh pixel columns 25, the fifth pixel column 25 is the reference pixel column 25R. By overlapping the exposure positions P in the pixel columns 25 on the scanning axis using such a reference pixel column 25R, even in a case where the scanning speed V1 and V2 are different from each other, the shift amount of the imaged figure of the sample S between the image data G1 and G2 can be sufficiently reduced.

Figure 14:
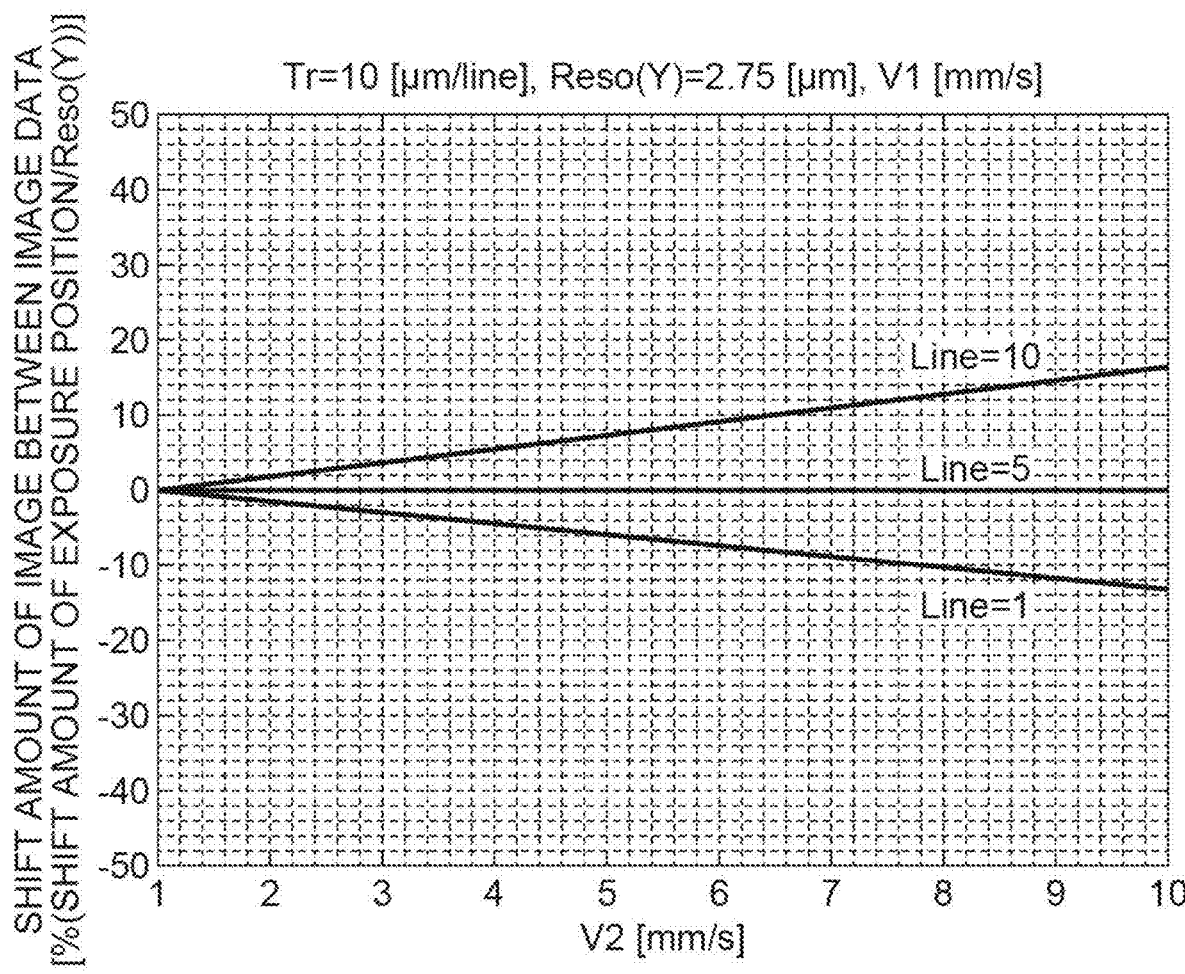
FIG. 14 is a diagram illustrating a relationship between scanning speed and shift amount of the imaged figure between image data in a case of setting the reference pixel column.

FIG. 14 is a diagram illustrating a relationship between the scanning speed and the shift amount of the imaged figure between image data in a case of setting the reference pixel column 25R. In FIG. 14, similarly to FIGS. 7 and 12, the roll time Tr is set to 10 [μs/line], the resolution R(Y) is set to 2.75 [μm], the scanning speed V1 with respect to the first direction is set to 1 [mm/s], and what is plotted is the shift amount of the imaged figure between the image data [% (=shift amount of exposure position/R(Y))] when the scanning speed V2 with respect to the second direction is changed. From the results in the drawing, it can be seen that the shift amount of the imaged figure between the image data is theoretically 0 in the fifth pixel column 25 that is the reference pixel column 25R, and the absolute value of the shift amount of the image between the image data with respect to the resolution R is suppressed to less than 20% also in the first pixel column 25 that is the array end and the tenth pixel column 25 close to the array end.

Figures 15A, 15B, 15C:
FIG. 15A is a schematic diagram illustrating an example of a method of setting the reference pixel column.
FIG. 15B is a schematic diagram illustrating an example of a method of setting the reference pixel column.
FIG. 15C is a schematic diagram illustrating an example of a method of setting the reference pixel column.

The method of setting the reference pixel column 25R is not particularly limited, but for example, a method using a linear encoder that detects the position of the stage 14 is conceivable. In the example of FIGS. 15A to 15C, the linear encoder outputs the trigger signal every time the stage 14 moves by a predetermined distance in the Y direction. In the image capturing unit 5, the interval between the input trigger signals is set as the exposure period T, the exposure of the nth frame is started at the timing of the input of the first trigger signal, the exposure of the nth frame is ended at the timing of the input of the next trigger signal, and at the same time, the exposure of the (n+1)th frame is started.

Figures 16A, 16B, 16C:
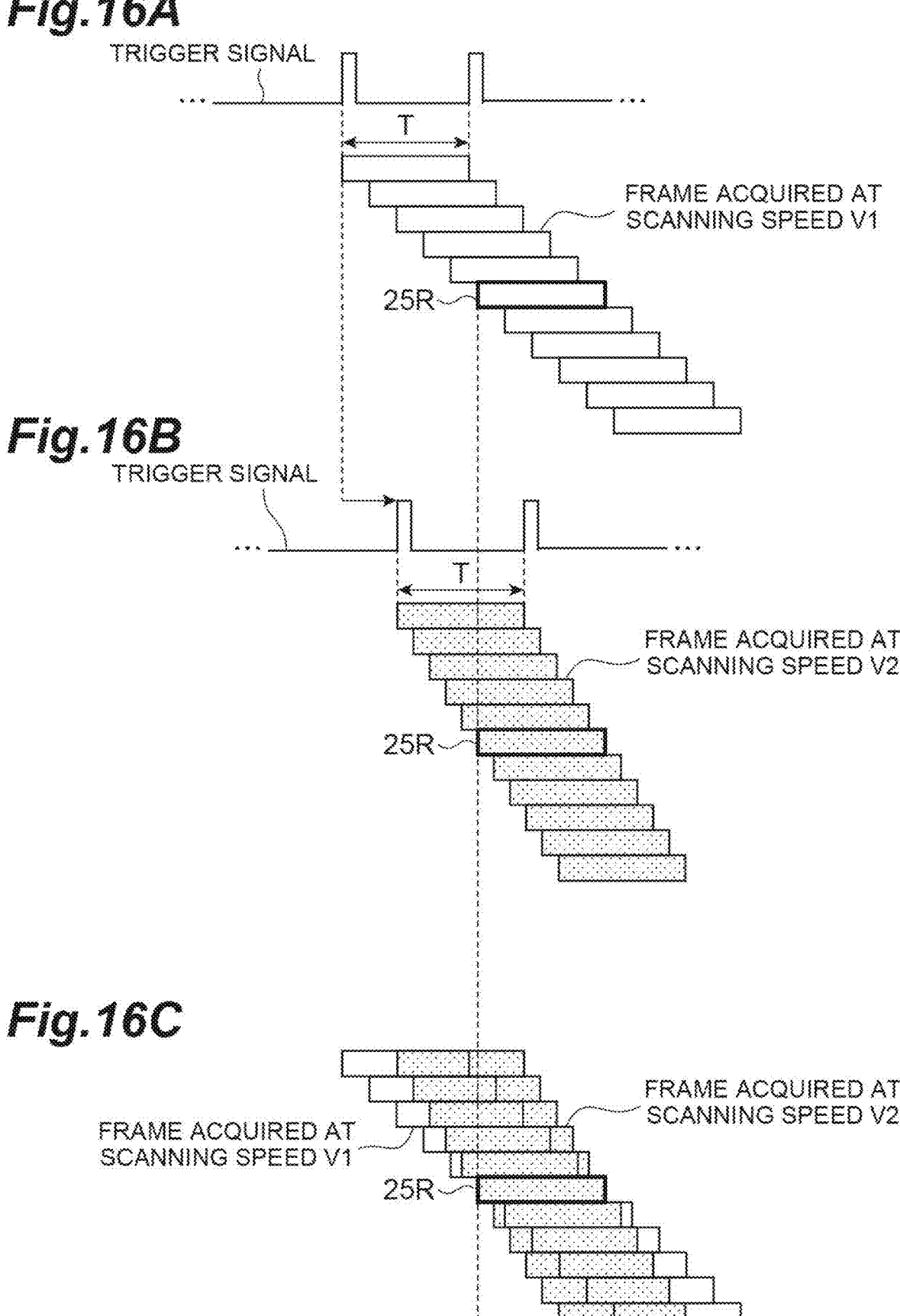
FIG. 16A is a schematic diagram illustrating another example of a method of setting the reference pixel column.
FIG. 16B is a schematic diagram illustrating another example of a method of setting the reference pixel column.
FIG. 16C is a schematic diagram illustrating another example of a method of setting the reference pixel column.

When the timings of inputting the trigger signals are aligned between the period of scanning in the first direction and the period of scanning in the second direction, the first pixel column 25 is set as the reference pixel column 25R as illustrated in FIGS. 15A to 15C. Furthermore, as illustrated in FIGS. 16A to 16C, an arbitrary intermediate pixel column can be set as the reference pixel column 25R by adjusting the trigger signal in the scanning period in the second direction so that the exposure period T of the intermediate pixel column excluding the array end coincides with the input of the trigger signal in the scanning period in the first direction.

Figure 17:
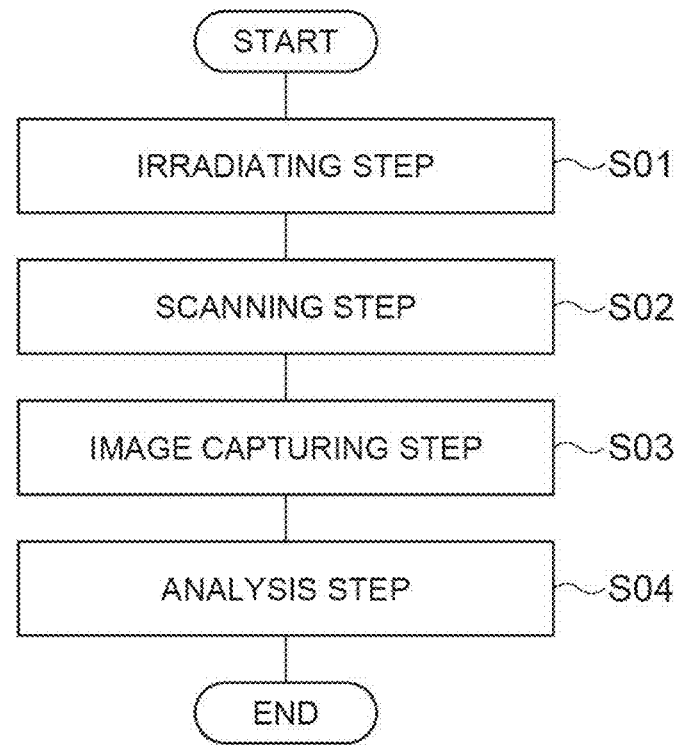
FIG. 17 is a flowchart illustrating a sample observation method according to an embodiment of the present disclosure.

FIG. 17 is a flowchart illustrating a sample observation method according to an embodiment of the present disclosure. As illustrated in the drawing, the sample observation method includes an irradiating step S01, a scanning step S02, an image capturing step S03, and an analysis step S04.

The irradiating step S01 is a step that irradiates the sample S with the planar light L1. In the irradiating step S01, the light L0 output from the light source 11 is shaped into planar light L1, and the sample S held in the container 13 is irradiated with the planar light L1. The observation light L2 based on the irradiation of the planar light L1 is generated from the sample S. The scanning step S02 is a step that scans the sample S with respect to the irradiation surface R of the planar light L1. Here, the stage 14 scans the sample S in a direction including the first direction (+Y direction) and the second direction (−Y direction) opposite to the first direction.

The image capturing step S03 is a step of image capturing the observation light L2 generated in the sample S by the irradiation of the planar light L1 and outputting the image data G based on the capturing result. In the image capturing step S03, using the area image sensor 21 that performs image capturing by the rolling shutter method in which the start of the exposure period T of each pixel column 25 in the pixel region 22 is shifted by predetermined time, the exposure order in the pixel columns 25 is reversed between the period in which the sample S is scanned in the first direction and the period in which the sample S is scanned in the second direction.

The analysis step S04 is a step of analyzing the sample S. In the analysis step S04, observation image data of the sample S is generated on the basis of the image data G obtained in the image capturing step S03, the sample S is analyzed on the basis of the generated observation image data, and an analysis result is generated.

As described above, in the sample observation device 1, the exposure order in each pixel column 25 is reversed between a period in which the scanning unit 3 scans the sample S in the first direction and a period in which the scanning unit 3 scans the sample S in the second direction. As a result, the direction of distortion of the imaged figure of the sample S can be aligned between the image data G1 acquired in the period for scanning in the first direction and the image data G2 acquired in the period for scanning in the second direction. As a result, even when the capturing image by the rolling shutter method is adopted, it is possible to reduce the difference in distortion of the imaged figure of the sample S between the image data G. By reducing the difference in distortion of the imaged figure of the sample S, the analysis accuracy of the shape and the existing position of the sample S can be improved even when processing is performed between the pieces of image data G.

According to the present embodiment, the control unit 6 can control the irradiation optical system 2 so that the sample S is irradiated with the planar light L1 having different wavelengths between the period in which the scanning unit 3 scans the sample S in the first direction and the period in which the scanning unit 3 scans the sample S in the second direction. Therefore, multi-wavelength measurement with planar light L1 of a plurality of wavelengths becomes possible. By aligning the direction of distortion of the imaged figure of the sample S by the above-described method, the occurrence of color shift of the image of the sample S in the image data G can be reduced even when the sample S is bidirectionally scanned using the planar light L1 of a plurality of wavelengths.

According to the present embodiment, the control unit 6 can control the scanning unit 3 so that the sample S is scanned with respect to the irradiation surface R of the planar light L1 at different scanning speed V1 and V2 between the period in which the scanning unit 3 scans the sample S in the first direction and the period in which the scanning unit 3 scans the sample S in the second direction. Therefore, measurement with different scanning conditions is possible. By aligning the direction of distortion of the image of the sample S by the above-described method, it is possible to reduce the difference in distortion of the imaged figure of the sample S between the image data G1 and G2 even when the sample S is scanned using a plurality of scanning conditions.

According to the present embodiment, the control unit 6 can control the image capturing unit 5 so that the roll time Tr represented by the time differences in the start of the exposure periods T in the pixel columns 25 are different from each other between the period in which the scanning unit 3 scans the sample S in the first direction and the period in which the scanning unit 3 scans the sample S in the second direction. Therefore, measurement with different exposure conditions is possible. By changing the inclination amount of distortion of the image of the sample S by the above-described method, it is possible to adjust the difference in distortion of the imaged figure of the sample S between the image data G1 and G2 even when the sample S is scanned using a plurality of exposure conditions.

According to the present embodiment, the control unit 6 can control at least one of the scanning unit 3 and the image capturing unit 5 such that an absolute value of the shift amount of the exposure position P in each pixel column 25 is 50% or less, or 20% or less of the resolution R(Y) between the period in which the scanning unit 3 scans the sample S in the first direction and the period in which the scanning unit 3 scans the sample S in the second direction. By suppressing the absolute value of the shift amount of the exposure position P to 50% or less of the resolution R(Y), it is possible to avoid the deviation of the analysis position in the sample S. Further, by suppressing the absolute value of the shift amount of the exposure position P to 20% or less of the resolution R(Y), it is possible to further reliably avoid the deviation of the analysis position in the sample S. In addition, even in the case of performing multi-wavelength measurement, it is possible to reduce the occurrence of color shift of the image of the sample S.

According to the present embodiment, the control unit 6 can set the reference pixel column 25R so that the exposure positions P of the intermediate pixel columns in the pixel columns 25 coincide with each other when the exposure positions P in the pixel columns 25 are overlapped on the scanning axis between the period in which the scanning unit 3 scans the sample S in the first direction and the period in which the scanning unit 3 scans the sample S in the second direction. By setting the reference pixel column 25R, it is easy to overlap images of the same region of the sample S. In addition, even when the scanning speed V1 and V2 are different between the period for scanning in the first direction and the period for scanning in the second direction, it is possible to effectively reduce the difference in distortion of the imaged figure of the sample S between the image data G1 and G2.

What is claimed is:

1. A sample observation device comprising:
an irradiation optical system configured to irradiate a sample with planar light;
a scanner configured to scan the sample in a direction including a first direction and a second direction opposite to the first direction with respect to an irradiation surface of the planar light;
an image capturer configured to include a pixel region for image capturing observation light generated in the sample by irradiation of the planar light to output image data based on a capturing result of the observation light in the pixel region; and
a controller configured to control respective operations of the irradiation optical system, the scanner, and the image capturer, wherein
the image capturer includes an area image sensor that performs image capturing by a rolling shutter method in which a start of an exposure period of each of pixel columns in the pixel region is shifted by predetermined time,
the controller controls the image capturer so that an exposure order in each of the pixel columns is reversed between a period in which the scanner scans the sample in the first direction and a period in which the scanner scans the sample in the second direction, and
the controller is configured to control the irradiation optical system so that the sample is irradiated with planar light having different wavelengths between a period in which the scanner scans the sample in the first direction and a period in which the scanner scans the sample in the second direction.

2. A sample observation device comprising:
an irradiation optical system configured to irradiate a sample with planar light;
a scanner configured to scan the sample in a direction including a first direction and a second direction opposite to the first direction with respect to an irradiation surface of the planar light;
an image capturer configured to include a pixel region for image capturing observation light generated in the sample by irradiation of the planar light to output image data based on a capturing result of the observation light in the pixel region; and
a controller configured to control respective operations of the irradiation optical system, the scanner, and the image capturer, wherein
the image capturer includes an area image sensor that performs image capturing by a rolling shutter method in which a start of an exposure period of each of pixel columns in the pixel region is shifted by predetermined time,
the controller controls the image capturer so that an exposure order in each of the pixel columns is reversed between a period in which the scanner scans the sample in the first direction and a period in which the scanner scans the sample in the second direction, and
the controller is configured to control the scanner so that the sample is scanned with respect to the irradiation surface of the planar light at different scanning speed between a period in which the scanner scans the sample in the first direction and a period in which the scanner scans the sample in the second direction.

3. A sample observation device comprising:
an irradiation optical system configured to irradiate a sample with planar light;
a scanner configured to scan the sample in a direction including a first direction and a second direction opposite to the first direction with respect to an irradiation surface of the planar light;
an image capturer configured to include a pixel region for image capturing observation light generated in the sample by irradiation of the planar light to output image data based on a capturing result of the observation light in the pixel region; and
a controller configured to control respective operations of the irradiation optical system, the scanner, and the image capturer, wherein
the image capturer includes an area image sensor that performs image capturing by a rolling shutter method in which a start of an exposure period of each of pixel columns in the pixel region is shifted by predetermined time,
the controller controls the image capturer so that an exposure order in each of the pixel columns is reversed between a period in which the scanner scans the sample in the first direction and a period in which the scanner scans the sample in the second direction, and
the controller is configured to control the image capturer so that roll time represented by a time difference of a start of an exposure period of each of the pixel columns is different from each other between a period in which the scanner scans the sample in the first direction and a period in which the scanner scans the sample in the second direction.

4. A sample observation device comprising:
an irradiation optical system configured to irradiate a sample with planar light;
a scanner configured to scan the sample in a direction including a first direction and a second direction opposite to the first direction with respect to an irradiation surface of the planar light;
an image capturer configured to include a pixel region for image capturing observation light generated in the sample by irradiation of the planar light to output image data based on a capturing result of the observation light in the pixel region; and
a controller configured to control respective operations of the irradiation optical system, the scanner, and the image capturer, wherein
the image capturer includes an area image sensor that performs image capturing by a rolling shutter method in which a start of an exposure period of each of pixel columns in the pixel region is shifted by predetermined time,
the controller controls the image capturer so that an exposure order in each of the pixel columns is reversed between a period in which the scanner scans the sample in the first direction and a period in which the scanner scans the sample in the second direction, and
the controller is configured to control at least one of the scanner and the image capturer such that an absolute value of shift amount of an exposure position in each of the pixel columns is 50% or less of resolution between a period in which the scanner scans the sample in the first direction and a period in which the scanner scans the sample in the second direction.

5. The sample observation device according to claim 4, wherein the controller is configured to control at least one of the scanner and the image capturer such that an absolute value of shift amount of an exposure position in each of the pixel columns is 20% or less of resolution between a period in which the scanner scans the sample in the first direction and a period in which the scanner scans the sample in the second direction.

6. A sample observation device comprising:

an irradiation optical system configured to irradiate a sample with planar light;

a scanner configured to scan the sample in a direction including a first direction and a second direction opposite to the first direction with respect to an irradiation surface of the planar light;

an image capturer configured to include a pixel region for image capturing observation light generated in the sample by irradiation of the planar light to output image data based on a capturing result of the observation light in the pixel region; and a controller configured to control respective operations of the irradiation optical system, the scanner, and the image capturer, wherein the image capturer includes an area image sensor that performs image capturing by a rolling shutter method in which a start of an exposure period of each of pixel columns in the pixel region is shifted by predetermined time, the controller controls the image capturer so that an exposure order in each of the pixel columns is reversed between a period in which the scanner scans the sample in the first direction and a period in which the scanner scans the sample in the second direction, and the controller is configured to set a reference pixel column so that exposure positions of intermediate pixel columns in the pixel columns coincide with each other when exposure positions in the pixel columns are overlapped on a scanning axis between a period in which the scanner scans the sample in the first direction and a period in which the scanner scans the sample in the second direction.

7. A sample observation method comprising:
irradiating a sample with planar light;
scanning the sample in a direction including a first direction and a second direction opposite to the first direction with respect to an irradiation surface of the planar light; and
image capturing by using a pixel region for image capturing observation light generated in the sample by irradiation of the planar light to output image data based on a capturing result of the observation light in the pixel region, wherein
the image capturing uses an area image sensor that performs image capturing by a rolling shutter method in which a start of an exposure period of each of pixel columns in the pixel region is shifted by predetermined time, and the scanning reverses an exposure order in each of the pixel columns between a period in which the sample is scanned in the first direction and a period in which the sample is scanned in the second direction, and in the irradiating, the sample is irradiated with planar light having different wavelengths between a period in which the sample is scanned in the first direction and a period in which the sample is scanned in the second direction.

8. A sample observation method comprising:
irradiating a sample with planar light;
scanning the sample in a direction including a first direction and a second direction opposite to the first direction with respect to an irradiation surface of the planar light; and
image capturing by using a pixel region for image capturing observation light generated in the sample by irradiation of the planar light to output image data based on a capturing result of the observation light in the pixel region, wherein
the image capturing uses an area image sensor that performs image capturing by a rolling shutter method in which a start of an exposure period of each of pixel columns in the pixel region is shifted by predetermined time, and the scanning reverses an exposure order in each of the pixel columns between a period in which the sample is scanned in the first direction and a period in which the sample is scanned in the second direction, and
in the scanning, the sample is scanned with respect to an irradiation surface of the planar light at different scanning speed between a period in which the sample is scanned in the first direction and a period in which the sample is scanned in the second direction.

9. A sample observation method comprising:
irradiating a sample with planar light;
scanning the sample in a direction including a first direction and a second direction opposite to the first direction with respect to an irradiation surface of the planar light; and
image capturing by using a pixel region for image capturing observation light generated in the sample by irradiation of the planar light to output image data based on a capturing result of the observation light in the pixel region, wherein
the image capturing uses an area image sensor that performs image capturing by a rolling shutter method in which a start of an exposure period of each of pixel columns in the pixel region is shifted by predetermined time, and the scanning reverses an exposure order in each of the pixel columns between a period in which the sample is scanned in the first direction and a period in which the sample is scanned in the second direction, and
in the image capturing, roll time represented by a time difference of a start of an exposure period in each of the pixel columns is different from each other between a period in which the sample is scanned in the first direction and a period in which the sample is scanned in the second direction.

10. A sample observation method comprising:
irradiating a sample with planar light;
scanning the sample in a direction including a first direction and a second direction opposite to the first direction with respect to an irradiation surface of the planar light; and
image capturing by using a pixel region for image capturing observation light generated in the sample by irradiation of the planar light to output image data based on a capturing result of the observation light in the pixel region, wherein the image capturing uses an area image sensor that performs image capturing by a rolling shutter method in which a start of an exposure period of each of pixel columns in the pixel region is shifted by predetermined time, and the scanning reverses an exposure order in each of the pixel columns between a period in which the sample is scanned in the first direction and a period in which the sample is scanned in the second direction, and an absolute value of shift amount of an exposure position in each of the pixel columns is 50% or less of resolution between a period in which the sample is scanned in the first direction and a period in which the sample is scanned in the second direction.

11. The sample observation method according to claim 10, wherein an absolute value of shift amount of an exposure position in each of the pixel columns is 20% or less of resolution between a period in which the sample is scanned in the first direction and a period in which the sample is scanned in the second direction.

12. A sample observation method comprising:

irradiating a sample with planar light;

scanning the sample in a direction including a first direction and a second direction opposite to the first direction with respect to an irradiation surface of the planar light; and image capturing by using a pixel region for image capturing observation light generated in the sample by irradiation of the planar light to output image data based on a capturing result of the observation light in the pixel region, wherein the image capturing uses an area image sensor that performs image capturing by a rolling shutter method in which a start of an exposure period of each of pixel columns in the pixel region is shifted by predetermined time, and the scanning reverses an exposure order in each of the pixel columns between a period in which the sample is scanned in the first direction and a period in which the sample is scanned in the second direction, and in the image capturing, a reference pixel column is set so that exposure positions of intermediate pixel columns in the pixel columns coincide with each other when the exposure positions in the pixel columns are overlapped on a scanning axis between a period in which the sample is scanned in the first direction and a period in which the sample is scanned in the second direction.

* * * * *